Figure 1:
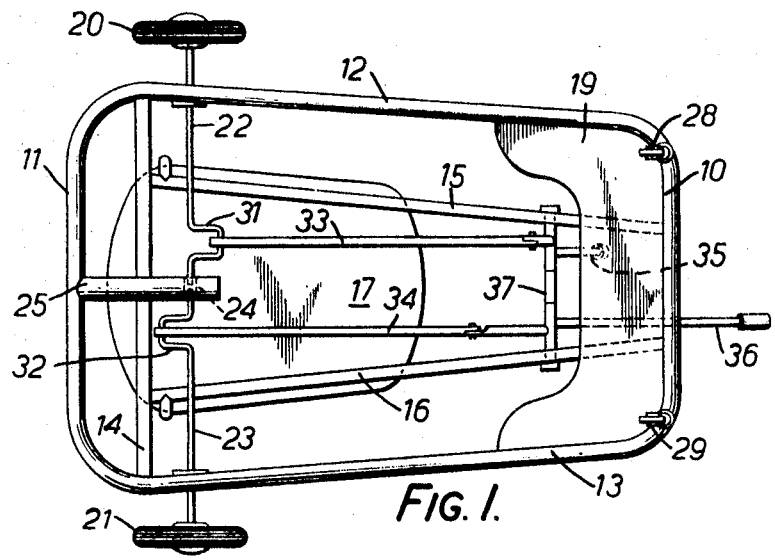

United States Patent

[11] 3,589,749

[72] Inventors George Malcolm Byrd;
Graham Jules Byrd, both of Wynch Farm,
Ashton-Under-Hill, near Evesham,
Worcestershire, England
[21] Appl. No. 789,747
[22] Filed Jan. 8, 1969
[45] Patented June 29, 1971
[32] Priority Jan. 19, 1969
[33] Great Britain
[31] 2984/68

[54] MANUALLY PROPELLED VEHICLES
3 Claims, 6 Drawing Figs.

[52] U.S. Cl............................................ 280/211, 280/247
[51] Int. Cl......................................... B62m 1/14
[50] Field of Search........................................ 280/211, 247, 243, 242, 244—246, 248—250, 282

[56] References Cited
UNITED STATES PATENTS

| 915,880 | 3/1909 | Orcutt | 280/247 |
| 1,105,216 | 7/1914 | Smith | 280/247 |
| 1,299,696 | 4/1919 | Evans | 280/247 |
| 1,995,155 | 3/1935 | Nelson | 280/211 |
| 2,592,025 | 4/1952 | Gray | 280/211 X |
| 3,282,605 | 11/1966 | Nihlean et al. | 280/211 |

Primary Examiner—Kenneth H. Betts
Attorney—Young & Thompson

ABSTRACT: A manual- or foot-operated vehicle, primarily for amusement purposes, having a seat, two driving wheels on fixed nonsteerable axes, the two wheels being driven independently by hand- or foot-operated levers or pedals, to provide forward propulsion and a steering effect, and also at least one self-aligning castor wheel.

INVENTORS
GEORGE MALCOLM BYRD
GRAHAM JULES BYRD
BY

*Young + Thompson*
ATTORNEYS

MANUALLY PROPELLED VEHICLES

This invention relates to vehicles provided with manual propulsion means and is particularly though not exclusively applicable to vehicles intended as toys or for amusement, educational or therapeutic purposes. The term "manual propulsion means" is intended broadly to include foot or leg propulsion in addition to hand operation.

In preferred forms of the invention the vehicle is so designed that some skill is necessary to steer the vehicle, which otherwise tends to move in random directions. The vehicles can be designed to require different degrees of skill and strength and can therefore be adapted to suit children of different ages, or adults.

Broadly the invention consists in a manually propelled vehicle having two nonsteerable driving wheels, and at least one nonsteerable castor wheel, and manually operated drive means for differentially driving the two driving wheels. The term "nonsteerable castor wheel" is intended to mean that the wheel can pivot for steering purposes about a substantially vertical axis, behind which the wheel may trail if desired to give a self-aligning characteristic, but no permanent positive steering connections are provided. The term will include a mere ball universally movable in a socket. The term "means for differentially driving" is not intended to mean that a differential mechanism is necessarily included; indeed preferably the drive means comprises two independently operated drive members connected respectively to the two driving wheels.

The drive members may be connected to the respective driving wheels through positive reversible drive mechanisms, that is to say in such a manner that movement of each drive member is accompanied at all times by corresponding movement of the associated driving wheel, or vice versa, in both forward and backward directions. With this type of mechanism considerable skill is needed since the two drive members may be moving out of phase. Alternatively the drive members may be connected to the respective driving wheels through unidirectional driving devices. This form of connection requires a lower degree of skill and provides correspondingly better control of the steering of the vehicle. However with such a unidirectional device it may be difficult to obtain sharp steering movements and the vehicle preferably includes braking mechanism for braking the driving wheels selectively.

Preferably the castor wheel or wheels are positioned at the front of the vehicle. This has two advantages; the weight of the driver can more easily be positioned over the main driving wheels, and the steering effect at the front of the vehicle is more positive and sharp so that the vehicle can more easily avoid obstacles.

According to a preferred feature of the invention the two driving wheels are mounted coaxially on opposite sides of the vehicle and are independently suspended. The vehicle may also include a braking device, engaging the periphery of one of the vehicle wheels, and arranged to be engaged automatically by the movement of the vehicle suspension when the load is removed from the vehicle.

Figure 2:
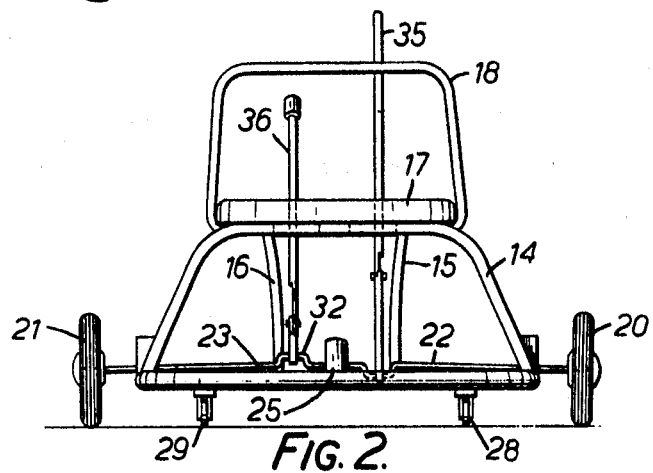
Figure 3:
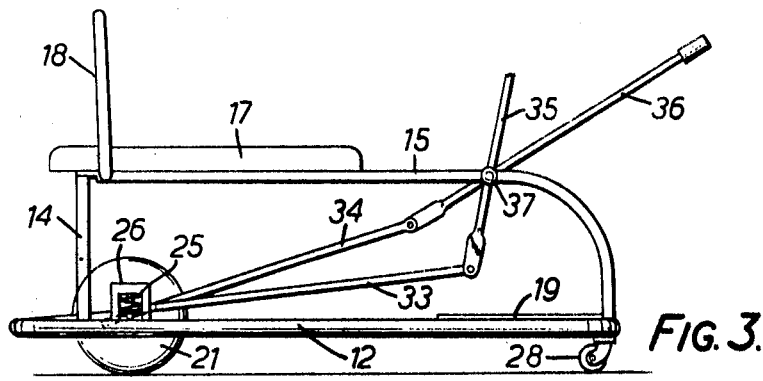
Figure 4:
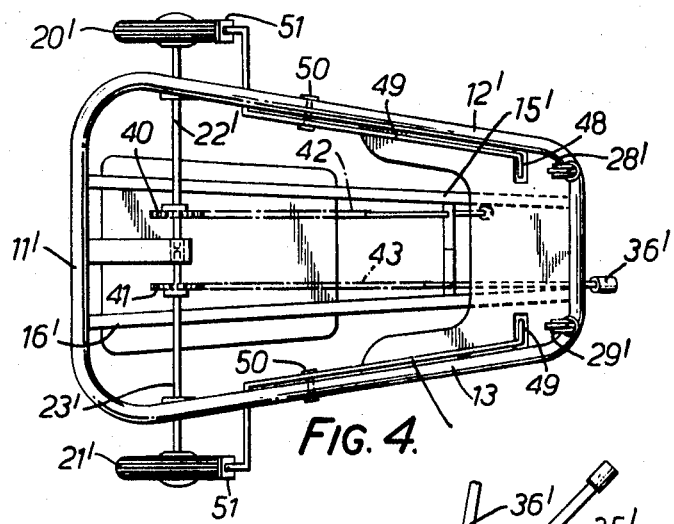
Figure 5:
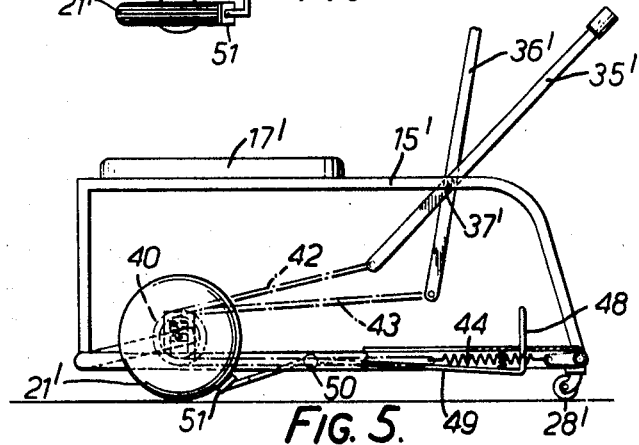
Figure 6:
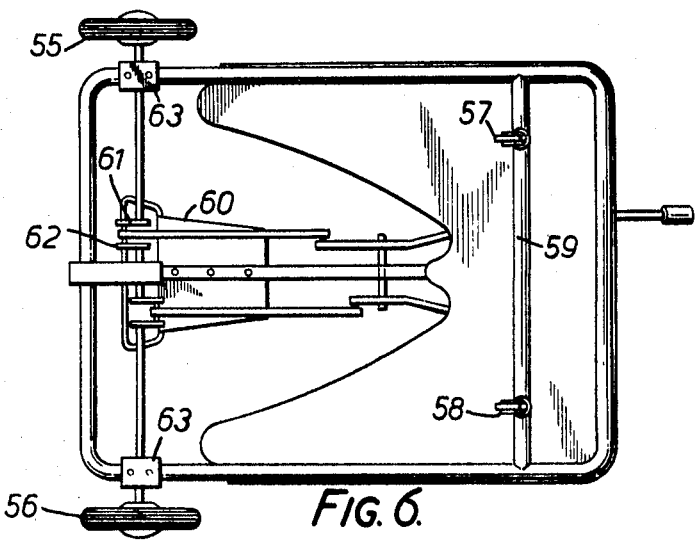

The invention may be performed in various ways and three specific embodiments of the invention will be described by way of example with reference to the accompanying drawings, in which FIG. 1 is an underneath plan view of a vehicle according to the invention, FIG. 2 is a rear end view of the vehicle of FIG. 1, FIG. 3 is a side elevation of the vehicle of FIGS. 1 and 2 with the near-side driving wheel removed to show the suspension, FIG. 4 is an underneath plan view of a second embodiment, FIG. 5 is a side elevation of the vehicle of FIG. 4, and FIG. 6 is an underneath plan view of a third embodiment.

In the first example illustrated in FIGS. 1, 2, and 3, the vehicle comprises a generally rectangular hooped-shaped chassis frame formed of metal tubing and having front and rear sections 10, 11, and side sections 12, 13. Across the rear of the frame a further arch-shaped tube 14 is rigidly connected, and from upper points of this arch two further tubes 15, 16 extend generally parallel horizontally towards the front of the vehicle where the tubes are bent down and connected to the front transverse main chassis member 10. A seat 17 is mounted on these two parallel tubes towards the rear end of the vehicle, and a hoop-shaped back rest 18 is attached to the tubes 16, 15, and so arranged that it can be folded forwards down onto the seat for storage or transport. A footboard 19 is attached to the chassis frame at the front end of the vehicle.

The main driving wheels 20, 21 are mounted on the chassis frame at the rear of the vehicle, approximately on a common transverse axis, each wheel being connected to a driving shaft or axle 22, 23, with the two inner ends of the axles independently mounted in a transverse bearing or bush 24 carried by a spigot 25 secured to the rear member 11 of the chassis frame. The two wheels 20, 31 can thus rotate independently. The outer part of each axle is connected to the chassis frame by an independent spring suspension including an apertured metal plate 26 attached to part of the chassis frame and formed with a vertical slot accommodating a spring 27 tending to urge the axle downwards relative to the chassis frame. The bearing 24 receiving the inner ends of the two axles has sufficient play to accommodate this independent movement. At the two front corners of the chassis frame there are mounted two small-diameter castor wheels 28, 29, supported in brackets which are free to pivot about vertical axes to align themselves with the direction of movement and so accommodate automatically for the steering movements of the vehicle.

The two driving wheel axles 22, 23, are cranked, and each cranked portion 31, 32 is connected by a crank rod 33, 34 to the lower end of one of two independently movable hand levers 35, 36 pivotally mounted on a fixed transverse axis 37 between the two parallel tubes 15, 16. Each lever 35, 36 therefore provides a positive driving connection to the respective driving wheel 20, 21, and similarly movement of either driving wheel is converted to oscillating movement of the respective hand lever. Assuming that the two cranks 31, 32 are initially aligned it will be seen that syncronous movement of the two levers 35, 36, will cause rotation of the driving wheels at the same speed and the vehicle will therefore move forwards in a straight line. To cause the vehicle to turn, one lever must be moved more rapidly than the other and therefore will become progressively out of phase. Steering of the vehicle can be obtained only by means of appropriate control of the two hand levers 35, 36, and the castor wheels 28, 29 merely follow the steering effect imparted by the driving wheels.

In the second example illustrated in FIGS. 4 and 5, the basic construction of the vehicle chassis and seat frame is similar to that described above and similar parts are indicated by the same numerals as in FIGS. 1, 2 and 3, with an added suffix. In this example the transverse frame tube 14 is omitted, and the two tubes 15', 16', have vertical portions extending down to the rear chassis member 11'. An important difference in this example is that the inner ends of the two driving wheel axles 22', 23', are connected to two chain drive sprockets 40, 41, incorporating free wheel devices. The lower end of each of the hand levers 35', 36' is connected to a chain 42, 43, which passes over and around the respective chain sprocket 40, 41, and is connected at its opposite end to one of two springs 44 anchored to the front end of the chasses frame. With this driving system, either or both of the hand levers 35', 36' can be held stationary without necessarily stopping the respective driving wheel 20', 21'. If the hand levers are out of phase it is therefore comparatively easy to return the levers into phase, which facilitates steering and also driving the vehicle in a straight forward direction. To provide for sharp steering this vehicle also includes two independent footbrakes for the rear driving wheels 20', 21'. Each brake comprises a foot pedal 48 attached to the front end of a long lever 49 pivotally mounted at 50 on the side member of the chassis frame, the rear part of this lever having a projection 51 arranged to engage the tire of the respective driving wheel 20', 21'. By engaging one footbrake and driving the opposite wheel, a very sharp steering effect can be obtained.

Each of the two driving wheels 20', 21', is independently sprung, as in the previous example, and each footbrake element 51 is arranged to engage a part of the wheel tire below a horizontal plane through the wheel axle, as shown in FIG. 5. Thus as the chassis frame moves downwards, when a driver mounts the vehicle, the driving wheels 20', 21' move somewhat upwards in relation to the brake members 51, and the brakes are automatically disengaged, though they can be reengaged by operation of the foot pedals. Similarly when the driver dismounts the brakes are automatically reengaged.

The third embodiment illustrated in FIG. 6, is basically similar to the first embodiment of FIGS. 1, 2, and 3, and the two driving wheels 55, 56, are driven by positive crank mechanism. In this example the chassis frame is almost truly rectangular; the two castor wheels 57, 58 are mounted on a fixed transverse chassis tube 59 positioned behind the front end of the chassis, and therefore somewhat closer to the main driving wheels; the seat 60 is positioned wholly in front of the driving wheel axis; the cranks on the driving wheel axles are provided by pairs of plates 61, 62, interconnected by a crankpin, instead of a bent part of the axle itself as shown in FIG. 1; and the driving axles are mounted in fixed bearings 63 attached to the chassis frame, without any spring suspension devices.

In the described embodiments the operating levers are hand operated and the mechanism converts oscillating movement thereof into rotary movement of the driving wheels. It will be understood however that the drive members may be foot operated and may be arranged for rotary or reciprocating motion of oscillating movement. It is also possible, though not in all cases desirable, that the castor wheels should be positioned at the rear of the vehicle, or there may be a single, or a pair, of castor wheels at both the front and rear of the vehicle, so arranged that the vehicle can rock or tilt somewhat about the driving wheels until either the front or rear castor wheels engage the ground. For this purpose the castor wheels at front and rear will be so positioned that their lowermost parts are slightly above a horizontal plane through the lowermost parts of the main driving wheels.

We Claim:

1. A hand-propelled amusement vehicle comprising a body, two rear driving wheels each secured to a drive shaft rotatably journaled in a bearing at the rear end of said body, the two said drive shafts being substantially coaxial but independently rotatable and each drive shaft being formed with an eccentric crank at a position adjacent to the longitudinal centerline of the vehicle at least one self-aligning pivoted castor wheel mounted on said body adjacent the front end thereof, a support structure mounted on and above said body and providing a seat at the rear end of said body substantially above said rear drive shafts, said support structure also extending forwardly from said seat along the longitudinal centerline of said vehicle and providing a transverse horizontal journal support for a pair of oscillating hand levers mounted closely side by side at an elevated position adjacent the forward end of said vehicle, said body providing footrests on opposite sides of said support structure, each of said oscillating hand levers extending downwards below said transverse horizontal journal support, a connecting link pivotally attached to the lower end of each hand lever and rotatably connected at its rear end to the respective one of said cranks on said rear drive shafts, the two connecting links extending generally horizontally from front to rear adjacent the longitudinal centerline of the vehicle, whereby the vehicle is both propelled and steered by oscillating movements of the two hand levers.

2. A hand-propelled amusement vehicle according to claim 1, wherein each of said two rear driving wheels is independently suspended from said body by a resilient suspension device.

3. A hand-propelled amusement vehicle according to claim 1, wherein the length of each said hand lever above said horizontal journal support is greater than the length of said lever below said journal support, and the length of said lever below said journal support is greater than the eccentricity of the respective rear drive shaft crank,